(12) United States Patent
Sun et al.

(10) Patent No.: US 8,467,531 B2
(45) Date of Patent: Jun. 18, 2013

(54) MOBILE TERMINAL WITH ENCRYPTION CHIP AND RELATED NETWORK LOCKING/UNLOCKING METHOD

(75) Inventors: Yingtong Sun, Shenzhen (CN); Wenqi Zhang, Shenzhen (CN)

(73) Assignee: Nationz Technologies Inc, Shenzhen (CN)

( * ) Notice: Subject to any disclaimer, the term of this patent is extended or adjusted under 35 U.S.C. 154(b) by 0 days.

(21) Appl. No.: 13/279,333

(22) Filed: Oct. 24, 2011

(65) Prior Publication Data

US 2012/0057701 A1   Mar. 8, 2012

Related U.S. Application Data

(63) Continuation of application No. PCT/CN2009/074656, filed on Oct. 28, 2009.

(30) Foreign Application Priority Data

Apr. 24, 2009   (CN) .......................... 2009 1 0106895

(51) Int. Cl.
*H04K 1/00*   (2006.01)
(52) U.S. Cl.
USPC ................. 380/247; 726/3; 455/558
(58) Field of Classification Search
USPC ................. 380/247; 726/3; 455/558
See application file for complete search history.

(56) References Cited

U.S. PATENT DOCUMENTS

| | | | | |
|---|---|---|---|---|
| 7,689,251 | B2 * | 3/2010 | Bae ............................... | 455/558 |
| 7,941,184 | B2 * | 5/2011 | Prendergast et al. .......... | 455/558 |
| 8,223,971 | B2 * | 7/2012 | Ahn .............................. | 380/277 |
| 2005/0096088 | A1 * | 5/2005 | Bae .............................. | 455/558 |
| 2007/0271603 | A1 * | 11/2007 | Lee et al. .......................... | 726/9 |
| 2008/0125094 | A1 * | 5/2008 | Heurtaux et al. ............. | 455/411 |
| 2008/0227432 | A1 * | 9/2008 | Lavabre et al. ............... | 455/410 |

* cited by examiner

*Primary Examiner* — Amare F Tabor
(74) *Attorney, Agent, or Firm* — Anova Law Group, PLLC

(57) ABSTRACT

A mobile terminal is provided with a network lock functionality for a network. The mobile terminal includes a subscriber identity module (SIM) slot configured to host a SIM card or an unlocking device, a control chip, an encryption chip, and a network locking module. The control chip is coupled to the SIM slot through a first interface, the encryption chip is coupled to the SIM slot through the first interface to communicate with a module inserted into the SIM slot, and the network locking module is coupled to the encryption chip through a second interface. Further, the network locking module is configured to perform the network lock functionality. The network locking module also has an "open" state supporting a network unlocking operational mode and a "close" state supporting a network locking operational mode. In addition, the encryption chip is configured to determine whether the module inserted into the SIM slot is the SIM card or the unlocking device and, when the encryption chip determines that the inserted module is not the unlock device, to set the "open" state or the "close" state of the network locking module to control the mobile terminal to enter in the network unlocking operational mode or the network locking operational mode, respectively.

16 Claims, 3 Drawing Sheets

MOBILE TERMINAL WITH ENCRYPTION CHIP AND RELATED NETWORK LOCKING/UNLOCKING METHOD

CROSS-REFERENCES TO RELATED APPLICATIONS

This application is a continuation application of PCT patent application no. PCT/CN2009/074656, filed on Oct. 28, 2009, which claims the priority of Chinese patent application no. 200910106895.6, filed on Apr. 24, 2009, the entire contents of all of which are incorporated herein by reference.

FIELD OF THE INVENTION

The present invention relates to the field of network security technology and, more particularly, to methods and systems for implementing network lock.

BACKGROUND

Currently, in order to develop users, mobile operators often conduct promotional activities such as giving away mobile terminals. Such activities not only help expanding the user base, but also help promoting mobile terminal brands, and the users can get mobile terminals at below-market prices or even for free. However, some mobile terminal vendors may obtain such low-priced mobile terminals from one original mobile operator, change the software of those mobile terminals, and then transfer those mobile terminals to other mobile operators' network-coverage areas to be sold at higher prices. This may cause the original mobile operator to suffer losses. Therefore, mobile operators need to restrict the mobile terminals from accessing other networks, and allow the mobile terminals only to be used in a particular range of networks, i.e., network lock.

Certain existing technologies use pure software to implement network lock. Software in a mobile terminal analyzes user information in the subscriber identity module (SIM), such as international mobile identification number (IMSI), etc. If the software in the mobile terminal determines that the user information is in line with the requirements from a corresponding mobile operator, the mobile terminal, such as a mobile phone, is allowed to function properly. If the user information does not meet the requirements, then the user is not allowed to use the mobile terminal.

With the pure software approach, whether or not the network lock mode can be effective is entirely determined by the software. Further, because mobile terminals may be sold in many places, and many different versions of software are concurrently available, it may be easy to find a software version that is not limited by the network lock. A third-party can then update the software in a mobile terminal with a software version without network lock to remove the network-lock function of the mobile terminal. The software in such scheme can be duplicated in a large scale within a short time period, forming a mass production.

The disclosed methods and systems are directed to solve one or more problems set forth above and other problems.

BRIEF SUMMARY OF THE DISCLOSURE

One aspect of the present disclosure includes a mobile terminal with a network lock functionality for a network. The mobile terminal includes a subscriber identity module (SIM) slot configured to host a SIM card or an unlocking device, a control chip, an encryption chip, and a network locking module. The control chip is coupled to the SIM slot through a first interface, the encryption chip is coupled to the SIM slot through the first interface to communicate with a module inserted into the SIM slot, and the network locking module is coupled to the encryption chip through a second interface. Further, the network locking module is configured to perform the network lock functionality. The network locking module also has an "open" state supporting a network unlocking operational mode and a "close" state supporting a network locking operational mode. In addition, the encryption chip is configured to determine whether the module inserted into the SIM slot is the SIM card or the unlocking device and, when the encryption chip determines that the inserted module is not the unlock device, to set the "open" state or the "close" state of the network locking module to control the mobile terminal to enter in the network unlocking operational mode or the network locking operational mode, respectively.

Another aspect of the present disclosure includes a network locking/unlocking method for a mobile terminal with a network lock functionality for a network. The mobile terminal has a subscriber identity module (SIM) slot configured to host a SIM card or an unlocking device, a control chip and an encryption chip both coupled to the SIM slot, and a network locking module coupled to the encryption chip. The method includes communicating with a module inserted into the SIM slot and determining whether the module inserted into the SIM slot is the SIM card or the unlocking device. The method also includes, when it is determined that the inserted module is not the unlock device, setting a state of the network locking module to one of an "open" state supporting a network unlocking operational mode or a "close" state supporting a network locking operational mode to control the mobile terminal to enter in one of the corresponding network unlocking operational mode and network locking operational mode, respectively.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
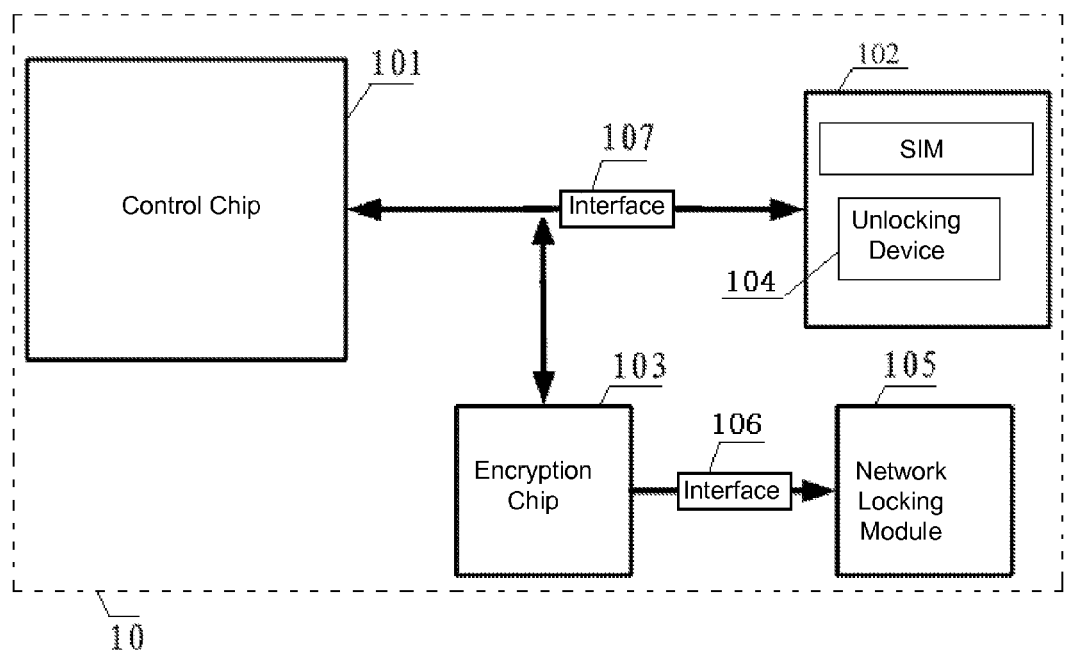
FIG. 1 illustrates a block diagram of an exemplary mobile terminal consistent with the disclosed embodiments.

FIG. 1 illustrates an exemplary mobile terminal incorporating certain aspects of the disclosed embodiments. As shown in FIG. 1, mobile terminal 10 includes a mobile terminal control chip 101, a subscriber identity module (SIM) slot 102, an encryption chip 103, a network locking module 105, an interface 106, and an interface 107. Other components may be added and certain devices may be omitted without departing from the principles of the disclosed embodiments.

The control chip 101 may include any appropriate type of microprocessor, microcontroller, or other type of processor configured to control the mobile terminal 10. The SIM slot 102 may be a socket, slot, or any other interface for hosting a subscriber identity module (SIM) card (as shown in FIG. 1, not numbered). The SIM slot 102 may also host an unlocking device 104 or other module(s). The mobile terminal control chip 101 (control chip 101) and the SIM slot 102 are electrically coupled through interface 107 such that control chip 101 and any module inserted in the SIM slot 102 can communicate or exchange communication information with each other. Further, the interface 107 may include any appropriate type of interface, such as an ISO/IEC 7816-3 standard interface, etc.

The network locking module 105 may include any appropriate device configured to realize the network lock function. The network lock function may refer to the capability to restrict the use of the mobile terminal according to a specific requirement or requirements. The network locking module 105 may have an "open" state and a "close" state and may operate in a network unlocking operational mode and network locking operational mode, respectively. In the network unlocking operational mode, network locking is not performed and mobile terminal software can be updated; while in the network locking operational mode, network locking is performed and the mobile terminal software cannot be updated.

The encryption chip 103 is coupled to the network locking module 105 through interface 106 to control operation of network locking module 105. For example, the encryption chip 103 may set the state of the network locking module 105 to the "open" state (network locking is not performed) or the "close" state (network locking is performed) to control the network locking module 105 to enter into the network unlocking operational mode or the network locking operational mode. The interface 106 may be a general input/output (I/O) interface.

Figure 2:
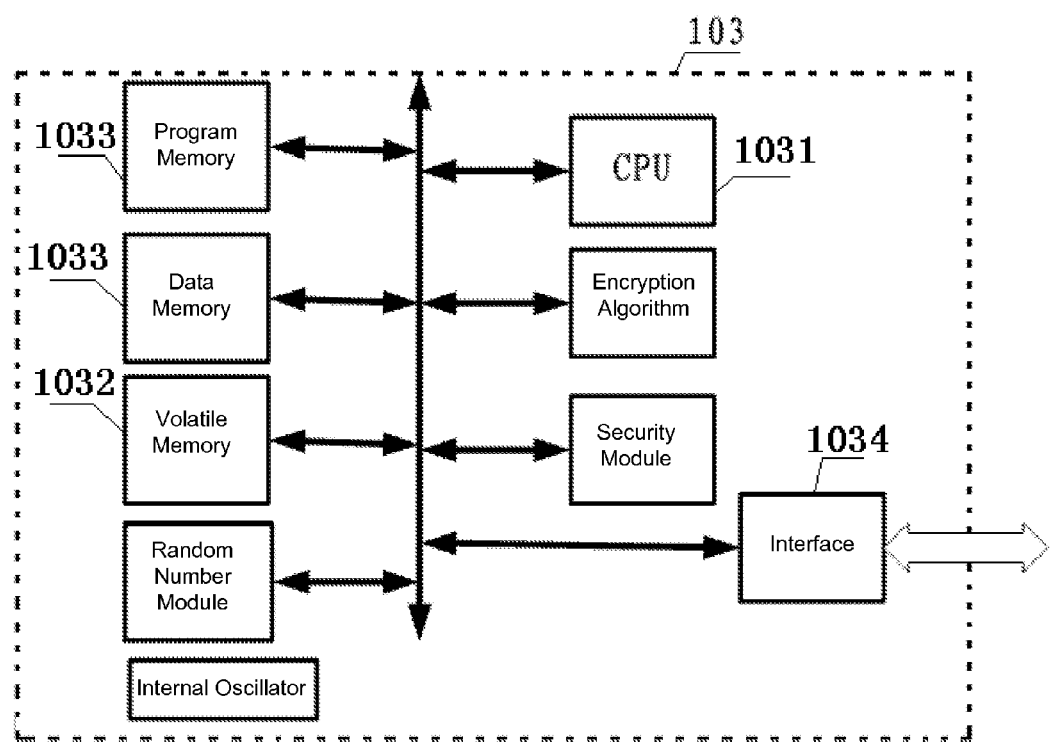
FIG. 2 illustrates a block diagram of an exemplary encryption chip consistent with the disclosed embodiments.

Further, the encryption chip 103 is also electrically coupled to the interface 107, and communicates with the module or modules inserted in the SIM slot 102. Thus, the encryption chip 103 may communicate with both the module inserted in the SIM slot 102 and the network locking module 105 to control the network lock function of the mobile terminal 10. FIG. 2 illustrates an exemplary encryption chip 103.

As shown in FIG. 2, the encryption chip 103 may include a microprocessor or central processor unit (CPU) 1031, volatile memory such as random access memory (RAM) 1032, data/program memory 1033 and an external interface 1034. The CPU 1031 may include any appropriate type of general processor, digital signal processor, or application specific integrated circuit (ASIC), etc., and data/program memory 1033 may include any appropriate type of non-volatile memory for storing data and program permanently or during run-time, such as flash memory, read-only memory (ROM), memory disc, etc. Although shown in two separate blocks, program memory 1033 and data memory 1033 may be separate memory modules or the same memory module, and may be referred jointly as data/program memory 1033.

The CPU 1031, RAM 1032, data/program memory 1033, and external interface 1034 are electrically coupled to certain internal communication buses (shown in arrowed lines) for data communication among one another. The encryption chip 103 may also include a random number module, an internal oscillator, an encryption algorithm module, and a security module, all of which are not numbered. Other devices may also be added or certain devices may be omitted.

The encryption chip 103 may be implemented in hardware, software, or a combination of hardware and software. For example, the encryption chip 103 may be a system-on-a-chip (SOC). Further, the encryption chip 103 may include certain storage (e.g., data/program memory 1033) for storing network-lock access information. The network-lock access information may refer to certain information setting the network lock function of the mobile terminal 10, such as whether a user is authorized to access a particular network or range of networks by certain mobile operator(s) and/or setting forth the requirement(s) of the network lock function. The storage may also be used to store certain programs and data used by encryption chip 103 during operation.

Returning to FIG. 1, during normal operation, the mobile terminal 10 may be configured to perform network-lock function based on the network-lock access information pre-stored in the encryption chip 103. For example, a SIM card may be inserted in the SIM slot 102 and the encryption chip 103 may obtain information from the SIM. Based on the pre-stored network-lock access information and the SIM information, the encryption chip 103 may determine whether to lock or unlock the network.

Because the network-lock access information is stored inside the encryption chip 103, it might be significantly costly and difficult for any unauthorized party to crack encryption chip software to change or erase the network-lock access information. Unlocking device 104 may then be provided to update the network-lock access information by an authorized user. Further, the unlocking device 104 can be inserted into the SIM slot 102 in such a way that the unlocking device 104 and the SIM card can be multiplexed through the SIM slot 102. Other methods may also be used.

When the mobile terminal needs to be unlocked, the unlocking device 104 is inserted into the SIM slot 102. Being inserted into the SIM slot 102, the unlocking device 104 can then communicate with the encryption chip 103. The unlocking device 104 may send information or instruction to the encryption chip 103 to update the network-lock access information within the encryption chip 103, under the control of the encryption chip 103.

Figure 3:
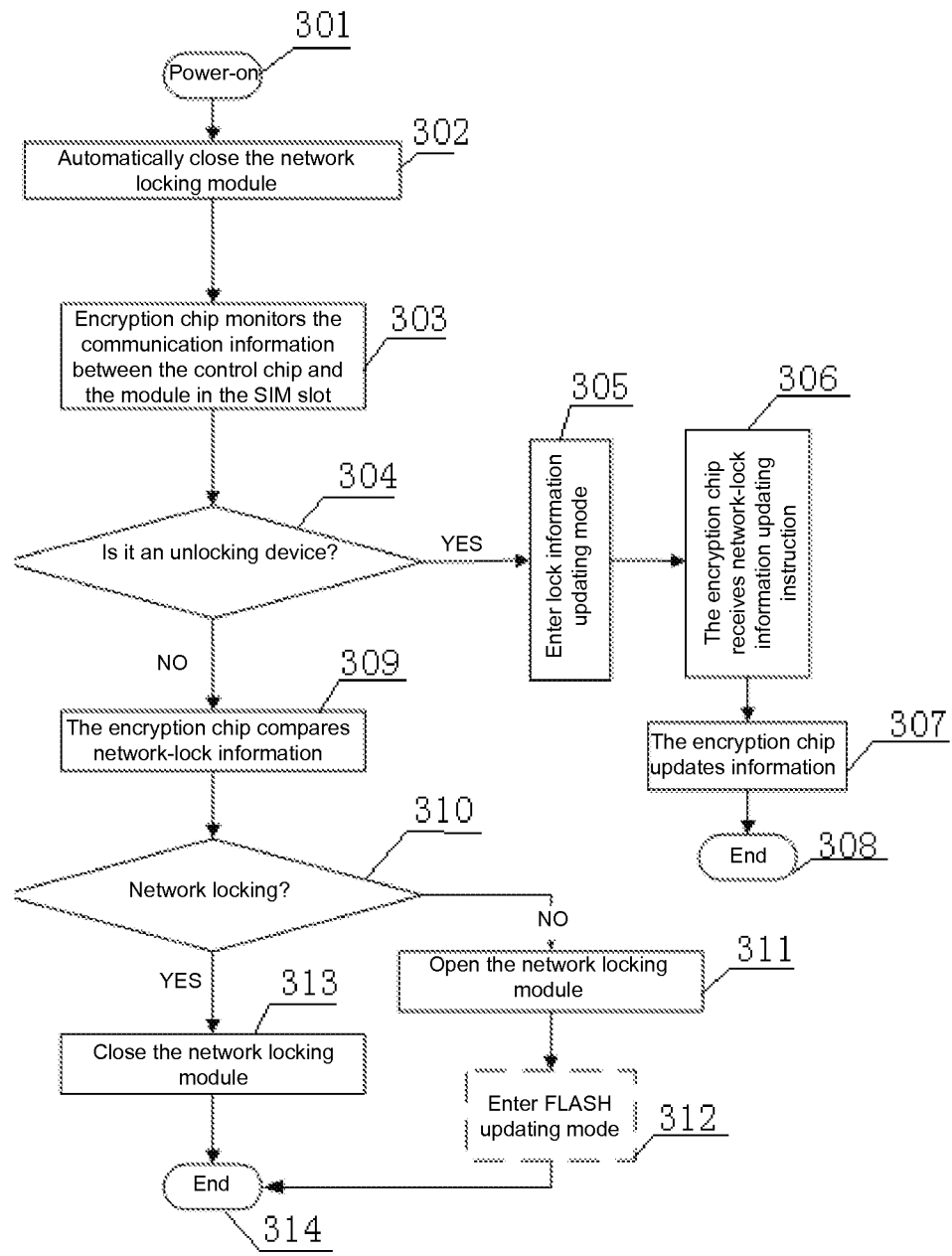
FIG. 3 illustrates an exemplary operational process of the mobile terminal consistent with the disclosed embodiments.

More particularly, FIG. 3 illustrates an exemplary operational process performed by the mobile terminal 10 (e.g., control chip 101, encryption chip 103, etc.). As shown in FIG. 3, at the beginning, the mobile terminal 10 is powered on (301). After the mobile terminal 10 is powered on, functional devices (e.g., control chip 101, encryption chip 103, network locking module 105, etc.) are initialized and become functional. The network locking module 105 may be automatically closed (i.e., in the "close" state) by itself and/or by encryption chip 103 (302).

Further, the encryption chip 103 may monitor the communication information between the control chip 101 and the module inserted into the SIM slot 102 (303). For example, the encryption chip 103 may monitor the communication information between the control chip 101 and the module inserted in the SIM slot 102 within a specified time period to obtain the communication information from the inserted module. Further, the encryption chip 103 may compare the obtained communication information with programs and/or data pre-stored in memory 1033 to determine whether the module inserted in the SIM slot 102 is a SIM card or an unlocking device 104 (304).

If the encryption chip 103 determines that the inserted module is the unlocking device 104 (304; YES), the encryption chip 103 will communicate with the unlocking device 104, and the encryption chip 103 may enter a network-lock access information updating mode (305). That is, the encryption chip 103 may analyze received instructions to determine whether to change network-lock access information in the encryption chip 103.

More particularly, the encryption chip 103 may receive or continue to receive network-lock access information updating instructions sent from the unlocking device 104 (306). Based on received communication (e.g., network-access related information) and/or the network-lock access information updating instructions from the unlocking device 104, the encryption chip 103 may determine whether the unlocking device 104 is legitimate, i.e., an authorized unlocking device. For example, the encryption chip 103 may first receive one or more instruction sent from the unlocking device 104, and then the encryption chip 103 may compare the received instruction with programs and data pre-stored in the data/program memory 1033, and thus determines whether the unlocking device 104 is an authorized unlocking device. If the unlocking device 104 is legitimate, the encryption chip 103 may update the network-lock access information within the encryption chip 103 (307).

For example, the encryption chip 103 may determine whether an instruction received from the authorized unlocking device 104 is an unlocking instruction or a locking instruction. That is, the encryption chip 103 may first receive the instruction sent from the unlocking device 104, and then the encryption chip 103 may compare the received instruction with programs and data pre-stored in the data/program memory 1033 and thus determines whether the received instruction is an unlocking instruction or a network locking instruction If the encryption chip 103 determines that the received instruction is an unlocking instruction, the encryption chip 103 erases the network-lock access information pre-stored within the encryption chip 103. On the other hand, if the encryption chip 103 determines that the received instruction is a locking instruction, the encryption chip 103 writes new network-lock access information (e.g., information contained in the locking instruction or any other information sent from the unlocking device 104) into the encryption chip 103. Thus, the pre-stored network-lock access information may be updated only by an authorized unlocking device 104, and the security of such information may be significantly increased. After the network-lock access information is updated (307), the encryption chip updating mode is ended and the operational process may be completed (308).

On the other hand, if the encryption chip 103 determines that the inserted module is not the unlocking device 104 (304; NO), the encryption chip 103 opens/closes or controls the "open"/"close" states of the network locking module 105 to control the mobile terminal 10 entering into network unlocking/locking operational modes. More particularly, the encryption chip 103 receives information from the SIM card inserted in the SIM slot 102 and compares the received information with the programs and data pre-stored in internal memory 1033 (309). For example, the information received from the SIM card may be compared with certain information of the network-lock access information and/or other information stored in the encryption chip 103.

After the encryption chip 103 compares programs and data pre-stored in internal memory 1033 with the received information from the SIM card, the encryption chip 103 may determine whether the received information requires locking the network (310). That is, based on the received information from the SIM card and the internal information stored in the encryption chip 103, mobile terminal 10 can determine whether or not to allow the user as identified by the SIM card to access the network.

If the encryption chip 103 determines that network locking is required (310; YES), the encryption chip 103 closes the network locking module 105 (313). That is, the encryption chip 103 sets the network lock module 105 in the "close" state such that the network locking module 105 performs the network lock function. Thus, the network lock module 105 enters into the network locking operational mode, and the mobile terminal software cannot be updated at this time.

On the other hand, if the encryption chip 103 determines that network locking is not required (310; NO), the encryption chip 103 opens the network locking module 105 (311). That is, the encryption chip 103 sets the network lock module 105 in the "open" state such that the network locking module 105 does not perform the network lock function. Thus, the network lock module 105 enters into the network unlocking operational mode.

Further, the mobile terminal 10 enters into a FLASH updating mode (312). The FLASH updating mode may allow certain mobile terminal software stored in non-volatile memory such as flash memory of the mobile terminal 10 and running within the mobile terminal 10 to be updated by the user. After the mobile terminal 10 enters into the FLASH updating mode, the mobile terminal software can be updated.

After either the network locking operational mode (313) or the network unlocking operational mode (312), the operational process may be completed (314). Other actions may also be performed.

The disclosed systems and methods may provide advantageous mobile terminal network locking/unlocking methods and apparatus using the encryption chip. Through multiplexing the SIM card and unlocking device, the mobile terminal can be flexibly configured for network locking and unlocking operations, and for changing network-lock access rights and scope. Thus, the disclosed systems and methods not only meet the customized terminal needs of the mobile operators, but also provide a simple and practical network locking and unlocking implementation for mobile operators. In addition, the disclosed systems and methods do not require changes to the mobile terminal firmware. Thus, the changes to the mobile terminal can be minimized.

Further, by using the disclosed systems and methods, it may be significantly costly and difficult to crack encryption chip software and almost impossible to update a different software version in the mobile terminal. Thus, it may prevent, from the root, large-scale updates of software in mobile terminals (such as mobile phones) given away or sold at low prices by mobile operators and selling these mobile terminals to users in another mobile operator's network coverage. Other advantages and applications may be obvious to those skilled in the art.

What is claimed is:

1. A mobile terminal with a network lock functionality for a network, comprising:
    a subscriber identity module (SIM) slot configured to host a SIM card and an unlocking device through multiplexing the SIM card and the unlocking device;
    a control chip coupled to the SIM slot through a first interface;
    an encryption chip coupled to the SIM slot through the first interface to communicate with a module inserted into the SIM slot;
    a network locking module coupled to the encryption chip through a second interface and configured to perform the network lock functionality, the network locking module having an "open" state supporting a network unlocking operational mode and a "close" state supporting a network locking operational mode;
    wherein the encryption chip is configured to:
        determine whether the module inserted into the SIM slot is the SIM card or the unlocking device by:

monitoring communication information between the control chip and the module inserted in the SIM slot within a specified time period;

obtaining the communication information from the inserted module;

comparing the obtained communication information with information stored in the data/program memory; and determining whether the inserted module is the SIM card or the unlocking device based on the comparison; and when the encryption chip determines that the inserted module is the SIM card, set the "open" state or the "close" state of the network locking module to control the mobile terminal to enter in the network unlocking operational mode or the network locking operational mode, respectively, based on network-lock access information setting forth requirements of the network lock functionality pre-stored in the encryption chip updatable through the unlocking device but not the SIM card.

2. The mobile terminal according to claim 1, wherein:
when the encryption chip determines that the inserted module is the unlocking device, the encryption chip is configured to determine whether to update the pre-stored network-lock access information based on a received instruction from the unlocking device.

3. The mobile terminal according to claim 2, wherein:
in the network unlocking operational mode, mobile terminal software can be updated; and
in the network locking operational mode, the mobile terminal software cannot be updated.

4. The mobile terminal according to claim 2, wherein:
the encryption chip is a system-on-a-chip including a microprocessor, volatile memory, data/program memory, and an external interface; and
the microprocessor, the volatile memory, the data/program memory, and the external interface are electrically coupled to one or more internal communication buses for communicating data with one another.

5. The mobile terminal according to claim 4, wherein, to set the "open" state or the "close" state of the network locking module, the encryption chip is further configured to:
receive information from the SIM card;
determine whether the received information requires locking the network, based on the received information from the SIM card; and
when the encryption chip determines that network locking is required, set the network lock module in the "close" state such that the network locking module performs the network locking and enters into the network locking operational mode, where mobile terminal software cannot be updated.

6. The mobile terminal according to claim 5, the encryption chip is further configured to:
when the encryption chip determines that network locking is not required, set the network lock module in the "open" state such that the network locking module does not perform the network locking and enters into the network unlocking operational mode, where the mobile terminal software can be updated.

7. The mobile terminal according to claim 4, wherein, to determine whether to update the pre-stored network-lock access information, the encryption chip is further configured to:
receive network-access related information from the unlocking device;
compare the received network-access related information with information pre-stored in data/program memory; and
determine whether the unlocking device is authorized based on the comparison.

8. The mobile terminal according to claim 7, the encryption chip is further configured to:
when the unlocking device is determined as authorized, determine whether the received instruction is an unlocking instruction or a locking instruction;
when the received instruction is the unlocking instruction, erase the pre-stored network-lock access information within the encryption chip; and
when the first instruction is the locking instruction, write new network-lock access information into the encryption chip.

9. A network locking/unlocking method for a mobile terminal with a network lock functionality for a network, the method comprising:
communicating with a module inserted into a subscriber identity module (SIM) slot configured to host a SIM card and an unlocking device through multiplexing the SIM card and the unlocking device and coupled to a control chip and an encryption chip, which is coupled to a network locking module;
determining whether the module inserted into the SIM slot is the SIM card or the unlocking device
monitoring communication information between the control chip and the module inserted in the SIM slot within a specified time period;
obtaining the communication information from the inserted module;
comparing the obtained communication information with information stored in the data/program memory; and
determining whether the inserted module is the SIM card or the unlocking device based on the comparison; and
when it is determined that the inserted module is the SIM card, setting a state of the network locking module to one of an "open" state supporting a network unlocking operational mode or a "close" state supporting a network locking operational mode to control the mobile terminal to enter in one of the corresponding network unlocking operational mode and network locking operational mode, respectively, based on network-lock access information setting forth requirements of the network lock functionality pre-stored in the encryption chip updatable through the unlocking device but not the SIM card.

10. The network locking/unlocking method according to claim 9,
when it is determined that the inserted module is the unlocking device, determining whether to update the pre-stored network-lock access information based on a received instruction received by the encryption chip from the unlocking device.

11. The network locking/unlocking method according to claim 10, wherein:
in the network unlocking operational mode, mobile terminal software can be updated; and
in the network locking operational mode, the mobile terminal software cannot be updated.

12. The network locking/unlocking method according to claim 9, wherein:
the encryption chip is a system-on-a-chip including an microprocessor, volatile memory, data/program memory, and an external interface; and the microprocessor, the volatile memory, the data/program memory, and the external interface are electrically coupled to one or more internal communication buses for communicating data with one another.

13. The network locking/unlocking method according to claim 12, wherein setting the state of the network locking module further includes:

receiving information from the SIM card;

determining whether the received information requires locking the network, based on the received information from the SIM card; and when it is determined that network locking is required, setting the network lock module in the "close" state such that the network locking module performs the network locking and enters into the network locking operational mode, where mobile terminal software cannot be updated.

14. The network locking/unlocking method according to claim 13, further including:

when it is determined that network locking is not required, setting the network lock module in the "open" state such that the network locking module does not perform the network locking and enters into the network unlocking operational mode, where the mobile terminal software can be updated.

15. The network locking/unlocking method according to claim 12, wherein determining whether to update the pre-stored network-lock access information further includes:

receiving network-access related information from the unlocking device;

comparing the received network-access related information with information pre-stored in data/program memory; and determining whether the unlocking device is authorized based on the comparison.

16. The network locking/unlocking method according to claim 15, further including:

when the unlocking device is determined as authorized, determining whether the received instruction is an unlocking instruction or a locking instruction;

when the received instruction is the unlocking instruction, erasing the pre-stored network-lock access information within the encryption chip; and when the first instruction is the locking instruction, writing new network-lock access information into the encryption chip.

* * * * *